(12) United States Patent
Ezrielev et al.

(10) Patent No.: US 12,333,037 B2
(45) Date of Patent: Jun. 17, 2025

(54) ON-DEMAND OPERATIONAL AIRGAP POLICY—VALUE THRESHOLD

(71) Applicant: Dell Products L.P., Round Rock, TX (US)

(72) Inventors: Ofir Ezrielev, Beer Sheva (IL); Jehuda Shemer, Kfar Saba (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 275 days.

(21) Appl. No.: 18/049,746

(22) Filed: Oct. 26, 2022

(65) Prior Publication Data

US 2024/0143817 A1     May 2, 2024

(51) Int. Cl.
| | |
|---|---|
| *G06F 21/62* | (2013.01) |
| *G06F 11/14* | (2006.01) |
| *G06F 21/55* | (2013.01) |
| *G06F 21/56* | (2013.01) |
| *G06F 21/60* | (2013.01) |

(52) U.S. Cl.
CPC ...... *G06F 21/6218* (2013.01); *G06F 11/1456* (2013.01); *G06F 21/552* (2013.01); *G06F 21/568* (2013.01); *G06F 21/60* (2013.01); *G06F 21/6227* (2013.01); *G06F 2221/2149* (2013.01)

(58) Field of Classification Search
CPC ............ G06F 21/6218; G06F 11/1456; G06F 21/552; G06F 21/568; G06F 21/60; G06F 21/6227; G06F 2221/2149
See application file for complete search history.

(56) References Cited

U.S. PATENT DOCUMENTS

| | | | |
|---|---|---|---|
| 10,387,963 B1 * | 8/2019 | Leise | H04M 3/527 |
| 2008/0168135 A1 * | 7/2008 | Redlich | G06F 16/282 |
| | | | 709/204 |
| 2020/0320215 A1 * | 10/2020 | Bhosale | G06F 11/1461 |
| 2022/0191204 A1 * | 6/2022 | Hasek | H04L 63/08 |

* cited by examiner

*Primary Examiner* — Cheng-Feng Huang
(74) *Attorney, Agent, or Firm* — Workman Nydegger

(57) ABSTRACT

One example method includes defining an airgap control policy that specifies a threshold data value, generating a value for a set of data, determining whether the value that has been generated for the data meets or exceeds the threshold data value, and opening the air gap when the value that has been generated for the data meets or exceeds the threshold data value. The airgap is closed automatically when the value that has been generated for the data meets or exceeds the threshold data value.

20 Claims, 3 Drawing Sheets

ON-DEMAND OPERATIONAL AIRGAP POLICY—VALUE THRESHOLD

FIELD OF THE INVENTION

Embodiments of the present invention generally relate to data protection. More particularly, at least some embodiments of the invention relate to systems, hardware, software, computer-readable media, and methods, for using the value of data as a basis for determining when an air gap protecting a vault in which the data is stored should be opened, so as to protect the data in the vault.

BACKGROUND

One approach to the protection of data in an air gapped vault involves opening the air gap, such that the data in the vault is protected from access by entities outside the vault, based on a time policy. That is, such a time policy may dictate that the air gap remain open for a specified period of time, and may further dictate that the air gap be opened on some sort of predetermined basis. Such time policies may be attractive because they are relatively easy to define and implement.

One problem with such policies however is that they reflect a simple, and naïve, approach to data protection. For example, typical time policies used to control the operation of an air gap fail to take account of the attributes of the data in question. Something more sophisticated may be required in some circumstances however.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
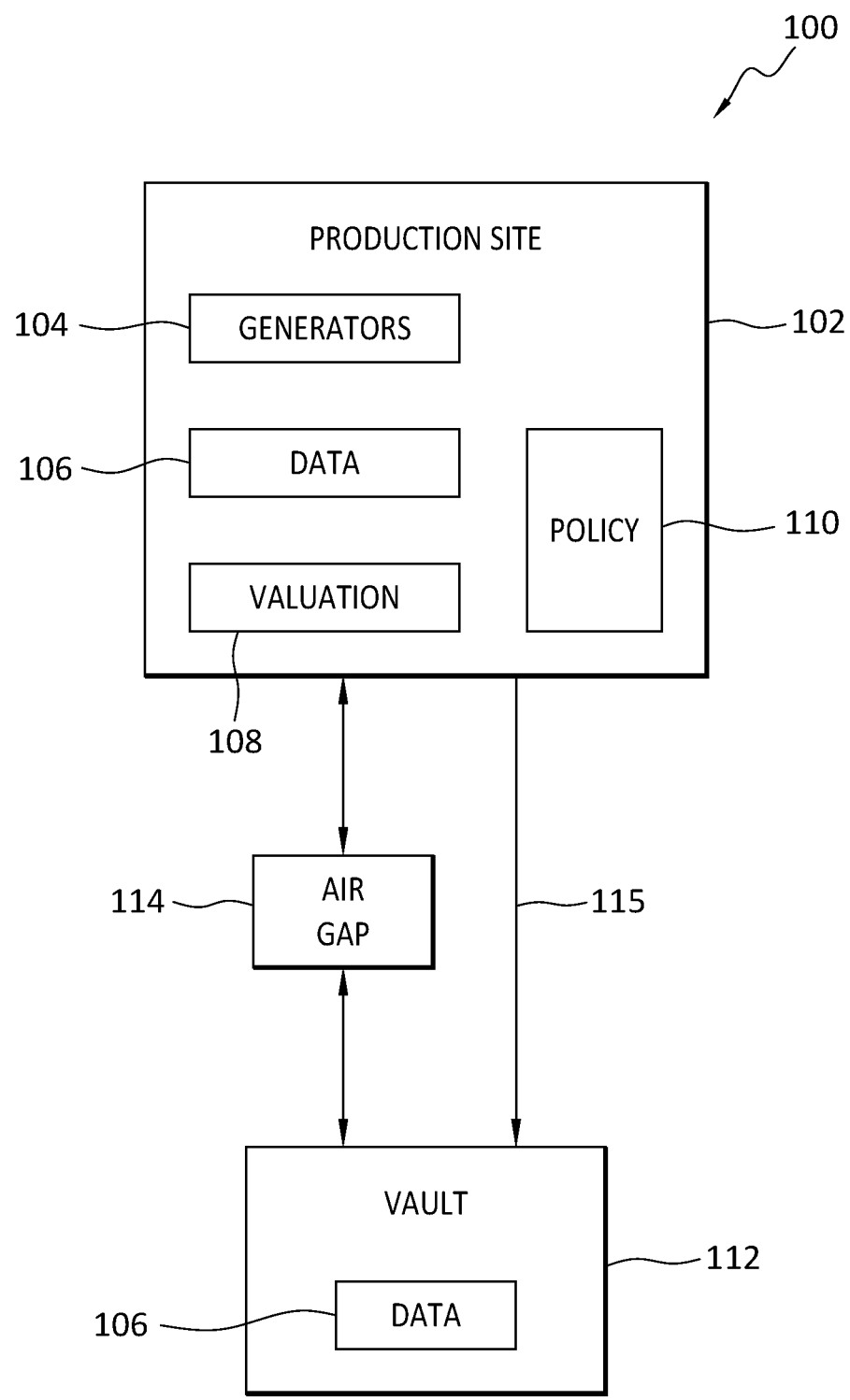
FIG. 1 discloses aspects of an example architecture according to an embodiment.

Embodiments of the present invention generally relate to data protection. More particularly, at least some embodiments of the invention relate to systems, hardware, software, computer-readable media, and methods, for using the value of data as a basis for determining when an air gap protecting a vault in which the data is stored should be opened, so as to protect the data in the vault.

In general, an example embodiment of the invention may comprise a mechanism for determining when, and/or for how long, an air gap to a vault that contains data is to be opened and/or is to remain open so as to protect the data. Such a mechanism may make these determinations based on the value of the data in the vault. The valuation may be made on relative terms, for example, one type of data may be relatively more valuable than another type of data. Additionally, or alternatively, the valuation may be made on an absolute basis, for example, the monetary effect of losing data 'A' is, or is expected to be, $50K, while the monetary effect of losing data 'B' is $25K.

When the data in the vault, or to be stored in the vault, has been valued, an air gap control policy may be defined that is tied to the value. For example, when the value of data in the vault, or to be stored in the vault, exceeds a threshold, the air gap may be opened, thus preventing access to that data after it has been stored in the vault. In this way, an embodiment may operate to prevent attacks on, and/or unauthorized access to, the data once the value of that data has met a specified threshold. As an attack on data of lower value may be a matter of less concern, the air gap may remain closed, so as to enable access to that lower value data. The air gap may also be closed to enable transfer of data into, and out of, the vault.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that an air gap may be controlled, on-demand. As another example, an embodiment may provide an air gap control policy that accounts for one or more attributes of the data to be protected. An embodiment may enable an air gap to remain closed at a time, and for a period of time, that corresponds with one or more attributes of data protected by the air gap. As another example, an embodiment may enable the identification of data of a particular value, and implementation of an air gap policy to protect the data based on the data value. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, and storage environments such as the Dell PowerProtect Cyber Recovery (CR) system. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM), containerized computing solutions, mobile devices, IoT (Internet of Things) systems and devices, edge devices and systems, and any other systems and devices, which may comprise hardware and/or software, that are capable of generating new and/or modified data.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With attention now to FIG. 1, details are provided concerning an example architecture and environment, one example of an operating environment for embodiments of the invention is denoted generally at 100. In general, the operating environment 100 may include a production site 102 at which normal computing operations of a business enterprise, or other entity, may take place. The production site 102 may include one or more data generators 104 that may operate to perform any of the disclosed operations concerning data. As part of their operations, the data generators 104 may generate data 106, which may comprise new and/or modified data. The data generators 104 may also cause the deletion of data. The data 106 may be stored in a data store at the production site 102, and the data 106 may be backed up from time to time, as discussed in more detail below.

The production site 102 may additionally comprise a valuation engine 108 that may be used to value the data 106 at the production site 102. The valuations generated by the valuation engine 108 may be used by a policy engine 110 to define and implement one or more policies concerning the data 106. As discussed below, one or more of such policies may relate to an air gap that may be used to enable selective access to a backup of the data 106. In an embodiment, the valuation engine 108 and the policy engine 110 may be respective stand-alone entities, or may be integrated together in an entity that may be stand-alone or incorporated into the production site 102 or the vault 112, or may each be integrated into the vault 112.

In more detail, the data 106 may be backed up or replicated at a vault 112 that may be protected by an air gap 114. Note that as used herein, an 'air gap' embraces a physical isolation, or separation, of a storage vault, such as the vault 112, from any exterior system or device that may be susceptible to attack. That is, when an air gap, such as the air gap 114, associated with a vault 112 is open, the air gapped vault 112 is physically detached, and unconnected, from such exterior devices. As such, when the air gap 114 is open, the air gapped vault 112 is not accessible by any form of wireless, or hardwire, including optical, communication system or device. Conversely, when the air gap 114 is closed, the vault 112, and some or all of its contents, may be accessible by external systems and devices, such as an application host for example, whether by wireless and/or hardwired communication channels.

In some embodiments, the vault 112 may comprise a Dell PowerProtect Cyber Recovery (CR) vault, but no particular vault is required. The vault 112 and part, or all, of its contents, may be isolated from the production site 102, and other external entities, when the air gap 114 is open. When the air gap 114 is closed, the vault 112 may be able to communicate with the production site 102 to transfer data, information, and metadata, for example, in either or both directions, between the vault 112 and production site 102, as shown in FIG. 1.

B. Aspects of Some Example Embodiments

As noted above, an embodiment may provide for the definition of policies, such as an air gap control policy for example, relating to data that has been backed up, and/or data that is targeted for backup. An example policy may specify, based on a data valuation, when, and for how long, an air gap should be closed so that a vault protected by the air gap can be accessed. Note that in connection with the following discussion, one example of a vault is the vault 112, and an example of an airgap is the airgap 114.

In more detail, and by way of example, a determination as to when to open/close an airgap may be according to a value threshold. That is, if data were backed up, and then changes occur to the data before the changes can be backed up, what would be the value of the unprotected, changed data if it were lost or compromised due to an attack occurring during a time when the air gap is closed?

The value of the data may be defined as scoring different types of application-specific differences. To use healthcare as an example, data concerning a salary raise for an employee may be assigned 'X' points, a medical record update for a mostly healthy person may be assigned 'Y' points, and a medical record update for a chronically ill patient may be assigned 'Z' points. These points values may indicate values of the different data types, relative to each other, or to an established standard.

In an embodiment, the value of data may be defined by the monetary effect of losing the new data. For example, if the value is determined to be below the maximal amount payable by the insurance company, there may be no need to open the airgap. But if the value is above the insurance policy limit, the airgap may be opened. Note that if the cost of losing changes to the data that exceed the maximum amount payable by the insurance company is a rare event, the airgap may be closed for significantly more time than may be specified by a static time-policy airgap.

Data value scoring may also be performed automatically, for example by defining a function over how much that data is being rewritten/read/used in other applications in the system. For example, data that is read most often may be assigned a relatively higher value than a value assigned to data that is not so frequently accessed.

When a dataset has reached a specified value threshold, which may be determined by ongoing monitoring of the data, changes made to the data, frequency of access to the data, and/or other parameters, an administrator may be so notified, and open the airgap, at least for the application that is associated with the data that has reached the value threshold. In some embodiments, the airgap may be opened automatically when the value threshold has been reached. In this way, when the value threshold for the data has been reached, the data can be protected by opening the airgap to the vault where the data is stored.

Note that the data may be stored in the vault immediately prior to the opening of the airgap, or at another time further in advance of the opening of the airgap. As well, by keeping the airgap closed until the value threshold has been reached, reading/writing of data from/to the vault may proceed on an ongoing, uninterrupted, basis. In an embodiment, the opening of the airgap, so as to protect the stored data, may be facilitated by showing a QR code or other code that may be created partly by the admin and partly by the application to the vault to improve the security of the process. Note further that an embodiment may provide a mechanism that is operable such that the production system may be able to convey to the vault either, the value of the data, when the value meets or exceeds the threshold value, or simply that the airgap should be opened, either globally or per application. With brief reference again to FIG. 1, these notifications, which may be transmitted 115 by the production site 102 to the vault 112, may be performed manually via an admin, or automatically through a secure notifications mechanism.

C. Example Methods

Figure 2:
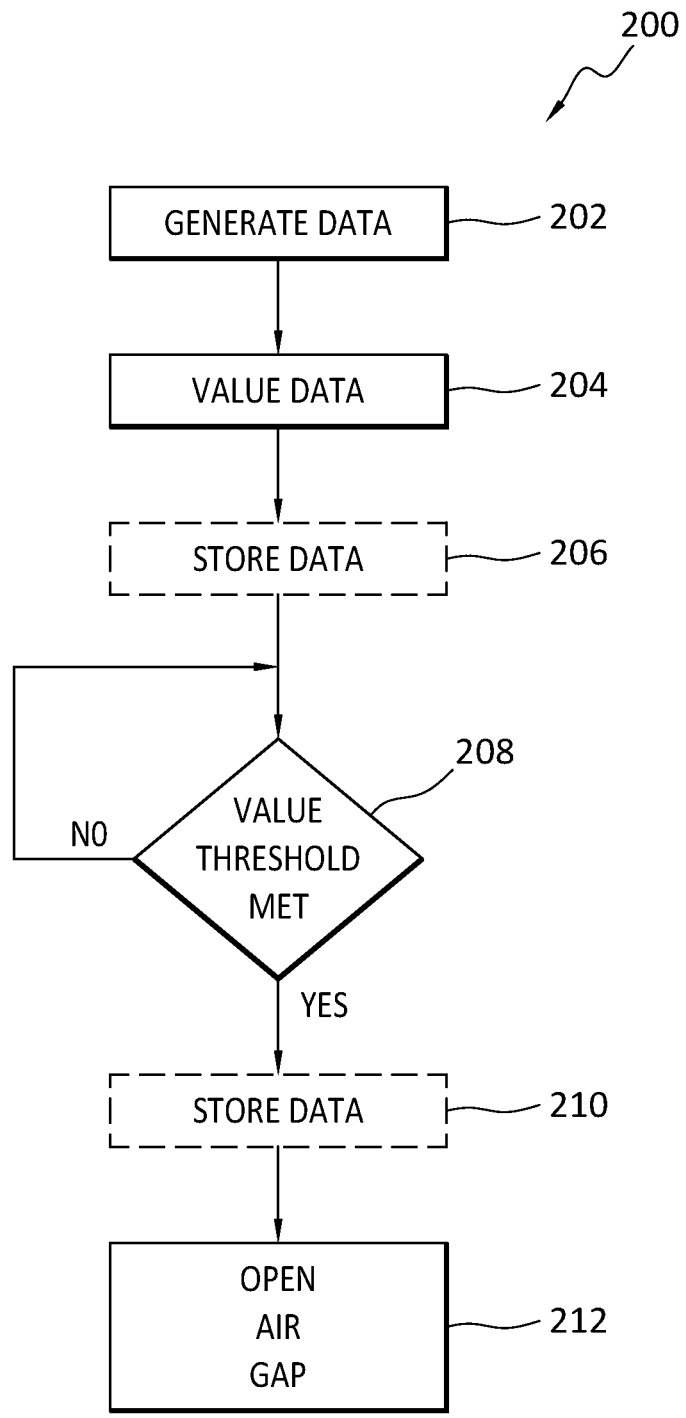
FIG. 2 discloses aspects of an example method according to an embodiment.

It is noted with respect to the disclosed methods, including the example method of FIG. 2, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 2, an example method according to one embodiment is denoted generally at 200. In an embodiment, the method 200 may be performed in part at a production site, and in part at a storage vault, although no particular functional allocation is necessarily required. In an embodiment, the entire method 200, except for the data storage, may be performed at a production site. In another embodiment, the entire method 200, except for generation of the data, may be performed at a storage vault. The foregoing are provided only by way of example, and are not intended to limit the scope of the invention in any way.

The method 200 may begin with the generation 202 of new and/or modified data. This data generation may be performed by data generators, such as one or more applications hosted by a client, and may be performed at a production site. After the data have been generated 202, the data may be valued 204, such as by a valuation module for example. As noted herein, the data valuation 204 may be performed on various bases including, but not limited to, the data generator that generated the data, the type of data, the frequency with which the data is accessed, the relative importance of the data to a business enterprise or other entity, the application(s) that generated the data, or any other basis which may be indicative in some way of the value of the data.

At some point after the data have been valued 204, the data may be stored 206 in a storage vault. In another embodiment, the data is stored at a different time, as discussed below. Once the data have been valued 204, and possibly after the data have already been stored 206, a check 208 may be performed to determine if the value of the data 208 meets or exceeds a specified threshold. If the threshold has not been met, the method 200 may continue to check the value of the data.

Note that the value of data may increase and/or decrease over time, and the method 200 may proceed on a basis that the value threshold has been met, or the value threshold has not been met. Note as well that the threshold value may be an element of a policy that may specify that the data must have a particular value before the method 200 can advance beyond 208.

If it is determined 208 that the value threshold for the data has been met, the data may then be stored 210 in a storage vault, if the data is not already in the vault. In either case, after the data value has met the threshold, and the data has been stored, the air gap to the vault may then be opened 212, so as to protect the data in the vault by preventing external systems, devices, or actors, from accessing the contents of the vault. Note that by defining when, and for how long, an airgap will be open, a policy according to one or more embodiments may also define, by implication, when, and for how long, an airgap will be closed such that access to the vault and its contents is enabled.

D. Further Example Embodiments

Following are some further example embodiments of the invention. These are presented only by way of example and are not intended to limit the scope of the invention in any way.

Embodiment 1. A method, comprising: defining an airgap control policy that specifies a threshold data value; generating a value for a set of data; determining whether the value that has been generated for the data meets or exceeds the threshold data value; and opening the air gap when the value that has been generated for the data meets or exceeds the threshold data value.

Embodiment 2. The method as recited in embodiment 1, wherein the air gap is opened in response to a command from a production site, or in response to an indication by the production site that the value meets or exceeds the threshold value.

Embodiment 3. The method as recited in any of embodiments 1-2, wherein the set of data is stored in a vault after determining whether the value that has been generated for the data meets or exceeds the threshold data value.

Embodiment 4. The method as recited in any of embodiments 1-3, wherein the value generated for the set of data is relative to another value of another set of data.

Embodiment 5. The method as recited in any of embodiments 1-4, wherein the value generated for the set of data is a monetary value.

Embodiment 6. The method as recited in any of embodiments 1-5, wherein the value generated for the set of data is based on a cost that would be incurred if the set of data were lost.

Embodiment 7. The method as recited in any of embodiments 1-6, wherein the threshold data value meets or exceeds a policy limit of an insurance policy that covers loss of the data.

Embodiment 8. The method as recited in any of embodiments 1-7, wherein the value of the set of data is monitored on an ongoing basis.

Embodiment 9. The method as recited in any of embodiments 1-8, wherein the airgap is closed automatically when the value that has been generated for the data meets or exceeds the threshold data value.

Embodiment 10. The method as recited in any of embodiments 1-9, wherein a notification is generated and transmitted when the value that has been generated for the data meets or exceeds the threshold data value.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of a non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
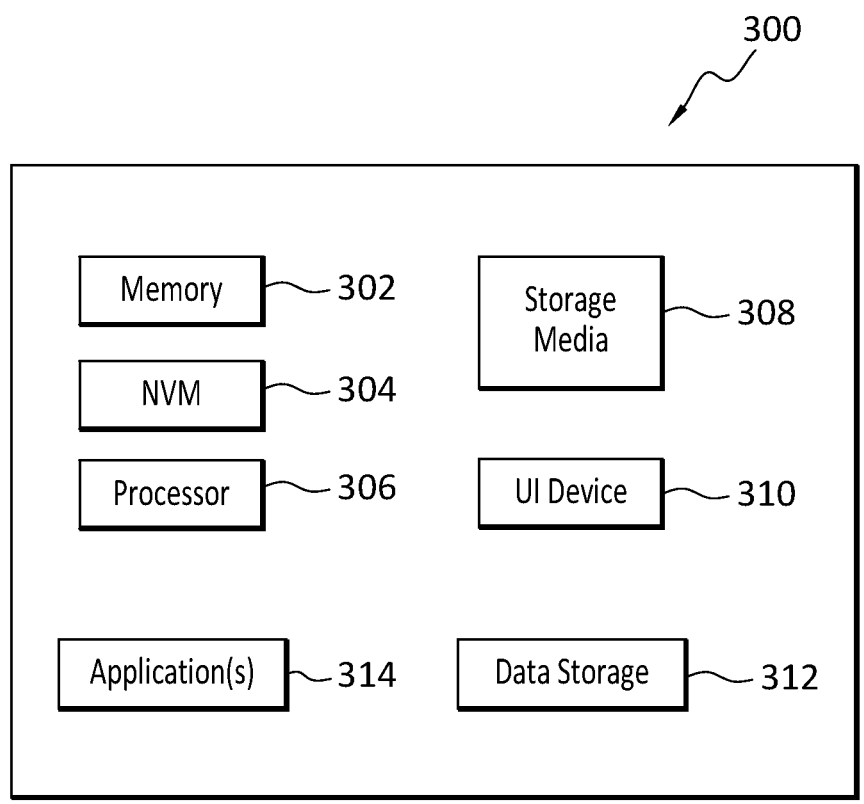
FIG. 3 discloses aspects of an example computing entity operable to perform any of the disclosed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI (user interface) device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
defining an airgap control policy that specifies a threshold data value;
generating a value for a set of data;
determining whether the value that has been generated for the data meets or exceeds the threshold data value; and
closing an air gap when the value that has been generated for the data meets or exceeds the threshold data value, wherein the air gap is closed longer than a time specified by a static time-policy air gap when the value is greater than a maximum threshold data value.

2. The method as recited in claim 1, wherein the air gap is closed in response to a command from a production site, or in response to an indication by the production site that the value meets or exceeds the threshold value.

3. The method as recited in claim 1, wherein the set of data is stored in a vault after determining whether the value that has been generated for the data meets or exceeds the threshold data value.

4. The method as recited in claim 1, wherein the value generated for the set of data is relative to another value of another set of data.

5. The method as recited in claim 1, wherein the value generated for the set of data is a monetary value.

6. The method as recited in claim 1, wherein the value generated for the set of data is based on a cost that would be incurred if the set of data were lost.

7. The method as recited in claim 1, wherein the threshold data value meets or exceeds a policy limit of an insurance policy that covers loss of the data.

8. The method as recited in claim 1, wherein the value of the set of data is monitored on an ongoing basis.

9. The method as recited in claim 1, wherein the air gap is closed automatically when the value that has been generated for the data meets or exceeds the threshold data value.

10. The method as recited in claim 1, wherein a notification is generated and transmitted when the value that has been generated for the data meets or exceeds the threshold data value.

11. A non-transitory storage medium having stored therein instructions that are executable by one or more hardware processors to perform operations comprising:
defining an airgap control policy that specifies a threshold data value;
generating a value for a set of data;
determining whether the value that has been generated for the data meets or exceeds the threshold data value; and
closing an air gap when the value that has been generated for the data meets or exceeds the threshold data value, wherein the air gap is closed longer than a time specified by a static time-policy air gap when the value is greater than a maximum threshold data value.

12. The non-transitory storage medium as recited in claim 11, wherein the air gap is closed in response to a command from a production site, or in response to an indication by the production site that the value meets or exceeds the threshold value.

13. The non-transitory storage medium as recited in claim 11, wherein the set of data is stored in a vault after determining whether the value that has been generated for the data meets or exceeds the threshold data value.

14. The non-transitory storage medium as recited in claim 11, wherein the value generated for the set of data is relative to another value of another set of data.

15. The non-transitory storage medium as recited in claim 11, wherein the value generated for the set of data is a monetary value.

16. The non-transitory storage medium as recited in claim 11, wherein the value generated for the set of data is based on a cost that would be incurred if the set of data were lost.

17. The non-transitory storage medium as recited in claim 11, wherein the threshold data value meets or exceeds a policy limit of an insurance policy that covers loss of the data.

18. The non-transitory storage medium as recited in claim 11, wherein the value of the set of data is monitored on an ongoing basis.

19. The non-transitory storage medium as recited in claim 11, wherein the air gap is closed automatically when the value that has been generated for the data meets or exceeds the threshold data value.

20. The non-transitory storage medium as recited in claim 11, wherein a notification is generated and transmitted when the value that has been generated for the data meets or exceeds the threshold data value.

* * * * *